United States Patent [19]
Gutgsell

[11] Patent Number: 5,513,825
[45] Date of Patent: May 7, 1996

[54] TELESCOPIC ADJUSTABLE HEIGHT APPARATUS

[75] Inventor: David R. Gutgsell, Jasper, Ind.

[73] Assignee: Ditto Sales, Jasper, Ind.

[21] Appl. No.: 258,526

[22] Filed: Jun. 10, 1994

[51] Int. Cl.$^6$ ..................................... F16M 11/26
[52] U.S. Cl. ..................... 248/188.5; 108/144; 108/147; 248/161; 403/109; 403/377
[58] Field of Search ........................... 248/188.5, 188.2, 248/186, 157, 161, 412, 411, 132, 125, 414, 354.6, 354.3, 354.1; 403/109, 377, 378; 108/144, 147

[56] References Cited

U.S. PATENT DOCUMENTS

| | | | |
|---|---|---|---|
| 2,531,778 | 11/1950 | Merner | 248/188.5 X |
| 4,156,391 | 5/1979 | Ubezio | 108/144 X |
| 5,060,903 | 10/1991 | Schworer | 108/144 X |
| 5,243,921 | 9/1993 | Kruse et al. | 108/144 X |

Primary Examiner—Ramon O. Ramirez
Attorney, Agent, or Firm—Woodard, Emhardt, Naughton Moriarty & McNett

[57] ABSTRACT

A telescopic adjustable height apparatus designed to adjust the height of tabletops comprises a pair of slidably engaged columns, a multiple-step groove, and a hand wheel locking mechanism to secure the tabletop at the desired height. The column system includes an inner column, connected at one end to a tabletop and an outer column, connected at one end to a base structure. The inner column defines the vertical multiple-step groove. The outer column possesses a bore in one wall of the column through which the hand wheel fastener passes, and this bore maintains the position of the hand wheel locking mechanism. A first detent is located at the base of a first step and provides a first seat for the hand wheel locking mechanism. A second detent is located at the base of a second step and provides a second seat for the hand wheel locking mechanism. The hand wheel locking mechanism comprises a pin with a connection end shaped to be removably received within a detent, a bearing collar, and a hand wheel.

23 Claims, 7 Drawing Sheets

TELESCOPIC ADJUSTABLE HEIGHT APPARATUS

BACKGROUND OF THE INVENTION

This invention relates to adjustable furniture, and more particularly to tables having an apparatus to secure tabletops at various heights.

Tables of various sizes and shapes are employed in diverse applications and arrangements. As society grows, office and living space becomes ever more expensive. Space is therefore at a premium, and room sizes diminish. In such cramped conditions, a single table is often called upon to serve many different functions. The chosen table must therefore be adjustable for many different applications and many different users.

Such a multi-purpose table should be vertically adjustable to accommodate these different users in a comfortable position, and to help users perform their tasks more efficiently. A telescopic adjustable height apparatus which possesses groove steps of different depths and a hand wheel fastener to secure the tabletop at the desired height is advantageous in that users of all mechanical abilities and strengths may thereby raise or lower the table top slowly and with ease.

Prior table height adjustment devices are generally effective for providing the desired adjustment, but these devices usually comprise a smooth, rather than stepped, inner groove which cannot control the speed of the drop when the tabletop is lowered. Prior apparatus are also not designed to help a weak user raise the tabletop. Especially when used in a hospital setting or with a handicapped user, these prior art devices have been annoyingly difficult to adjust properly, and are even hazardous should anything sensitive be located under the table if it drops suddenly. Most prior apparatus for raising a table top have also not provided pneumatic devices to slow and control the rate of tabletop ascent and descent. A need therefore exists for a safe telescopic adjustable height mechanism capable of controllably raising and lowering a tabletop and securely locking the table top in the desired position. The present invention addresses this need.

SUMMARY OF THE INVENTION

A telescopic adjustable height apparatus for raising and lowering tabletops is described. The telescopic adjustable height apparatus is capable of being locked in preferably two different height positions by a retractable locking means, each position being defined by a detent. Above each detent, there is a step defined within a vertical multiple-step groove, a first step defining a first groove depth, and a second step defining a second groove depth.

In one embodiment of the invention, the telescopic adjustable height apparatus possesses an inner column and an outer column. The inner column contains and defines a vertical multiple-step groove on its outer surface. The groove possesses a first step defining a first groove depth, and a second step defining a second groove depth. At the base of the first step is located a first detent which provides a first seat for the retractable locking means. At the base of the second step, a second detent provides a second seat for the retractable locking means. The inner surface of the vertical multiple-step groove forms a shape identical to that of a shaped connection end of the retractable locking means.

When retractable locking means passes through a bore in one wall of the outer column. The bore controls the vertical motion of the retractable locking means relative to the ground surface. The retractable locking means includes a pin. The pin may be threaded or smooth and it includes a connection end shaped to be removably received within a detent.

When the retractable locking means is engaged at the farthest end, relative to the second detent, of the vertical multiple-step groove, the tabletop may be secured at its lowest point relative to the ground surface. As well, when the retractable locking means is slidably engaged into the first detent at its shaped connection end, the tabletop may be secured at an intermediate height relative to the ground surface. When the retractable locking means is slidably engaged into the second detent at its connection end, the tabletop may be secured at its highest point relative to the ground surface.

In another embodiment of the invention, the bore in the outer column is enclosed within a housing attached to the wall of the outer column. Once the retractable locking means is passed through the housing and into the bore, a fastener held by the housing maintains the position of the retractable locking means within the housing. The fastener provides greater security against accidental disengagement between the retractable locking means and the inside and outer columns. This particular embodiment is particularly useful for preventing injury to elderly or handicapped users and to small children who might try to remove the retractable locking means from the housing.

In yet another embodiment of the present invention, the inner column possesses a rack on the exterior of one wall of the inner column in place of the vertical multiple-step groove. The locking means in this embodiment engages the inner column by means of a pinion.

In another embodiment of the instant apparatus, the inner column and outer column surround a pneumatic device situated between the tabletop and the base structure. This arrangement facilitates controlled, stable ascent and descent of the tabletop, and constitutes one object of the present invention.

It is one object of the present invention to provide a mechanically simple, yet efficient, telescopic adjustable height apparatus. It is another object to provide a device that includes a positive locking feature not susceptible to accidental release. Still another object of the present invention is to provide a device that can be secured at various heights to accommodate a variety of uses. Another object is to provide a device that includes a securely positioned tabletop, which security is not diminished due to wear and tolerance variations within the working components of the device.

Other objects, and certain benefits, of the present invention will become apparent to those of ordinary skill in the art from the following written description and accompanying figures.

DESCRIPTION OF THE PREFERRED EMBODIMENTS

Figure 1:
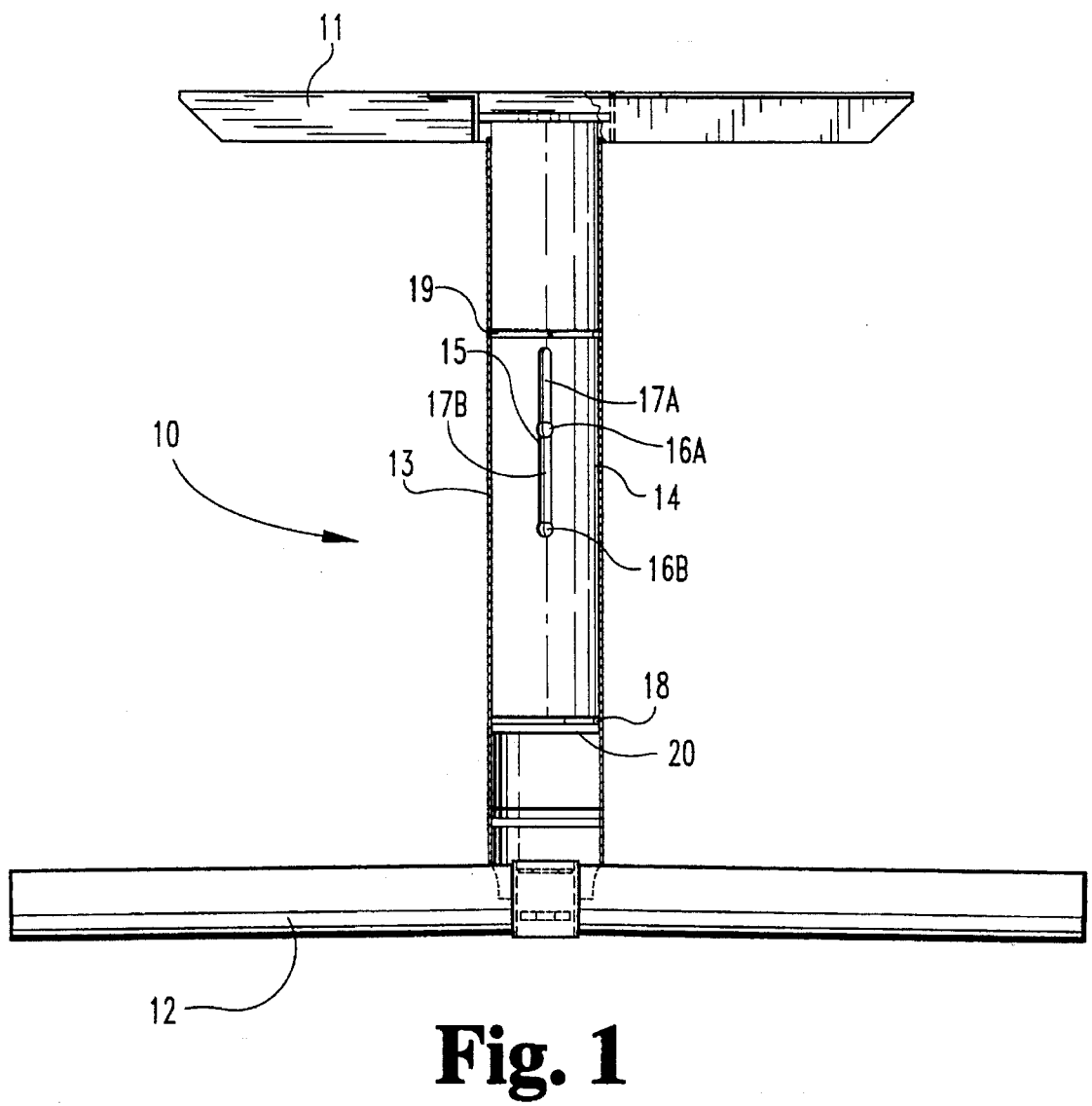
FIG. 1 is a side partial cross-sectional view of the telescopic adjustable height apparatus according to one embodiment of the invention, showing the tabletop, the base structure, the inner column, the outer column, and the multiple-step groove as milled into the inner column.

For the purposes of promoting an understanding of the principles or the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Once preferred embodiment of the present invention is represented in FIG. 1 by numeral 10. FIG. 1 is a side cross-sectional view of the apparatus for the telescopic adjustment of a tabletop showing a tabletop 11, a base structure 12, an outer column 13, an inner column 14, a vertical multiple-step groove 15, and spacers 18 and 19. The tabletop is shown at its lowest height relative to the ground surface.

Figure 2:
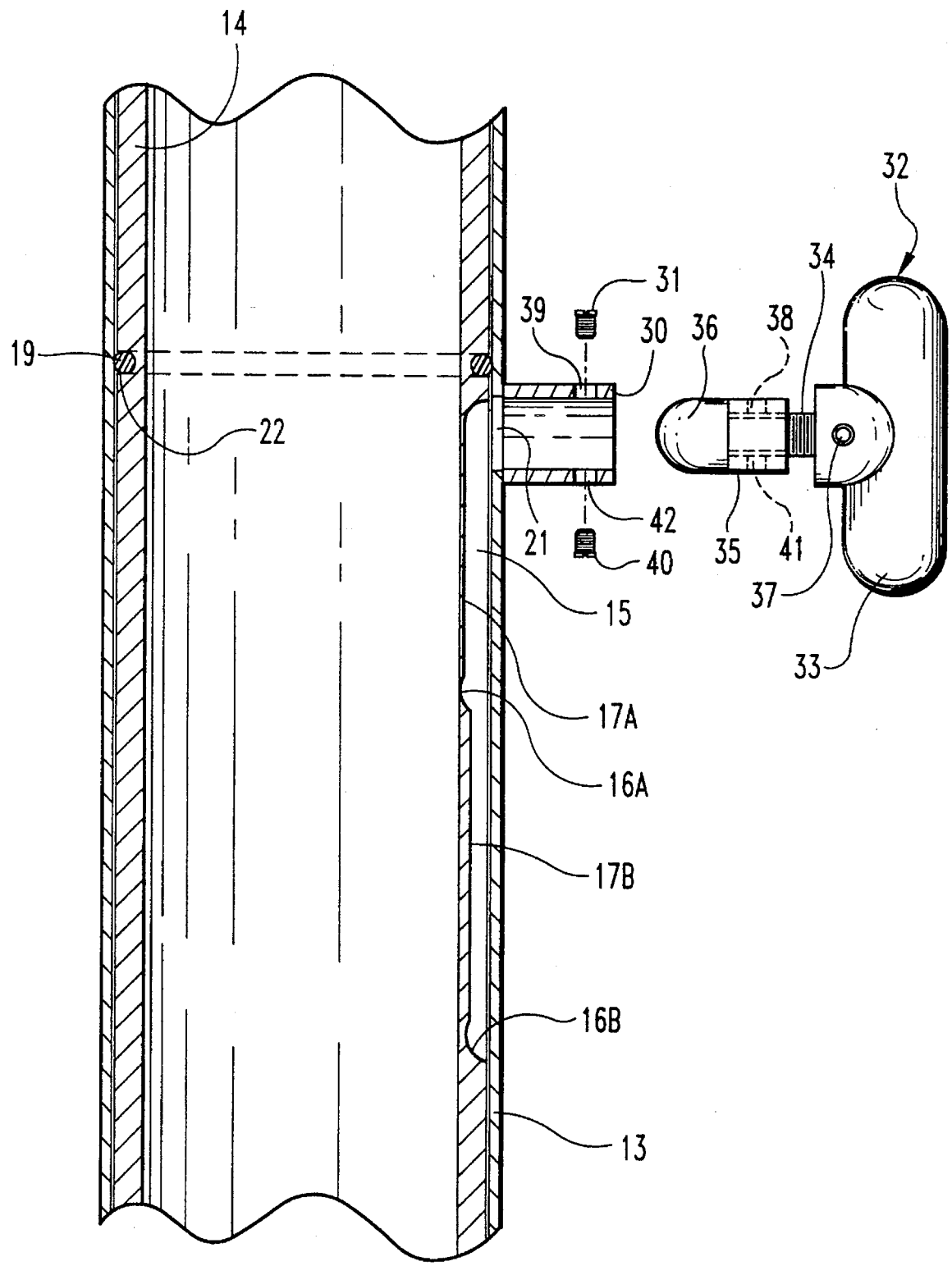
FIG. 2 is an enlarged cross-sectional view of the telescopic adjustable height apparatus according to a second preferred embodiment, showing a housing attached to the outer column through which the retractable locking means passes, and further displaying the attachment means whereby the retractable locking means is secured within the housing.

The inner column 14 has a vertical multiple-step groove 15 formed in one of its walls. Referring to FIG. 2 this multiple-step groove 15, according to one preferred embodiment, includes a number of detents 16A and 16B, and a number of steps 17A and 17B corresponding to the number of detents. Each step 17A, B within the vertical multiple-step groove 15 defines a different groove depth. The outer column 13 contains an opening 21 in the wall of the column.

Figure 3:
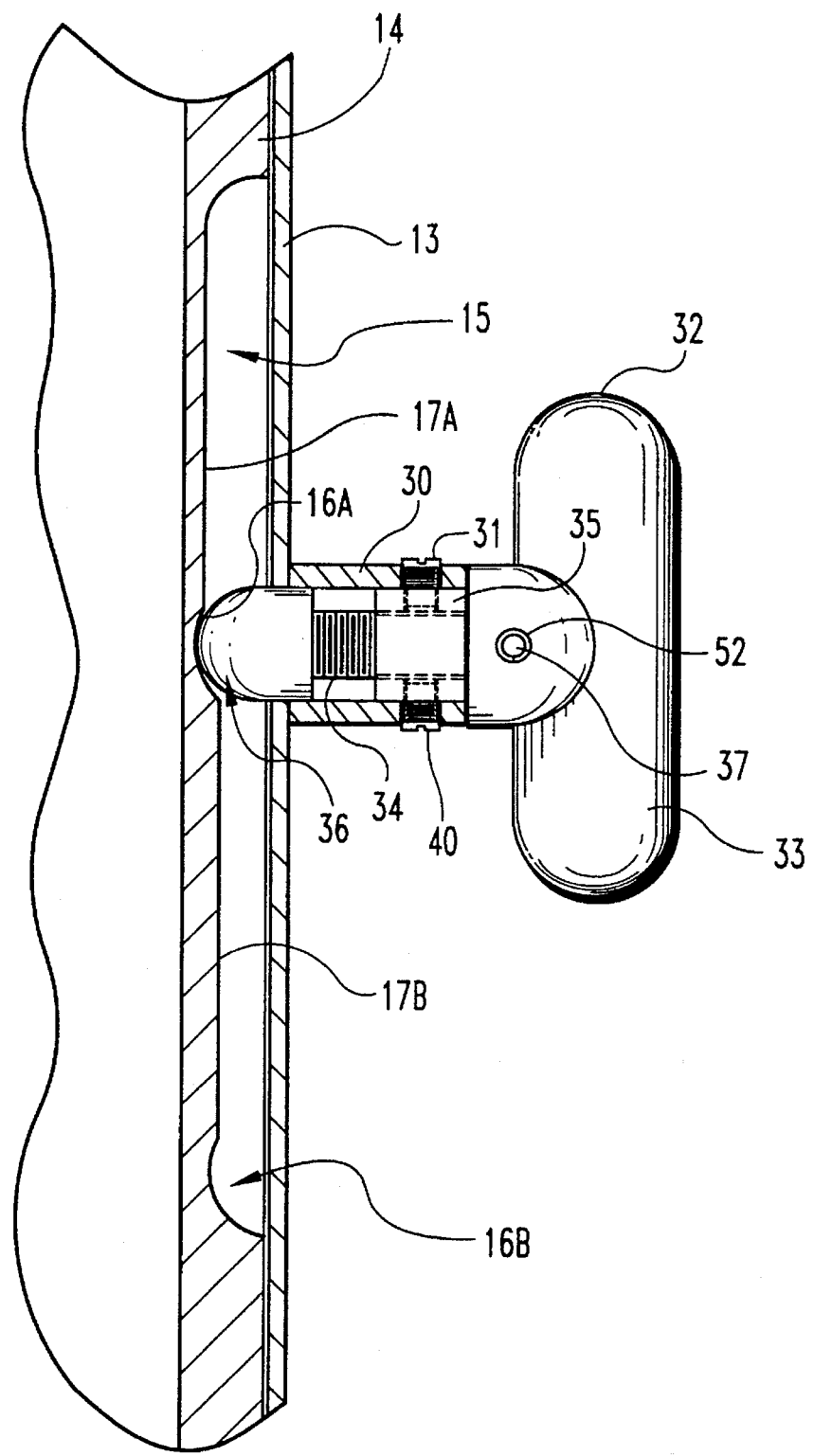
FIG. 3 is an enlarged side cross-sectional view of the adjustable height apparatus of FIG. 2 showing the retractable locking means removably received within a detent shaped to receive the shaped connection end of the retractable locking means.

Each detent 16A, 16B is located at the base or each corresponding step 17A, 17B and provides a seat for a retractable locking means 32 as depicted in FIG. 3. This alternating arrangement of steps and detents can be repeated a number of times to achieve the desired number of adjusted table heights.

A spacing means including first and second spacers 18 and 19 are located on the exterior walls of the inner column 14. The spacing means are positioned within grooves circumferentially defined in the exterior of the inner column, as depicted in FIG. 2 by groove 22 with second spacer 19 therein. In the preferred embodiment, the first spacer 18 is located below the vertical multiple-step groove 15 and near the lower end 20 of the inner column 14. The second spacing means 19 is located just above the vertical multiple-step groove 15. The first and second spacers 18 and 19 are preferably hard rubber O-rings and are intended to reduce friction between the inner column 14 and the outer column 13 by creating a gap between the surfaces of these columns. It is contemplated that the O-rings could be made of any material designed to reduce friction.

Figure 4:
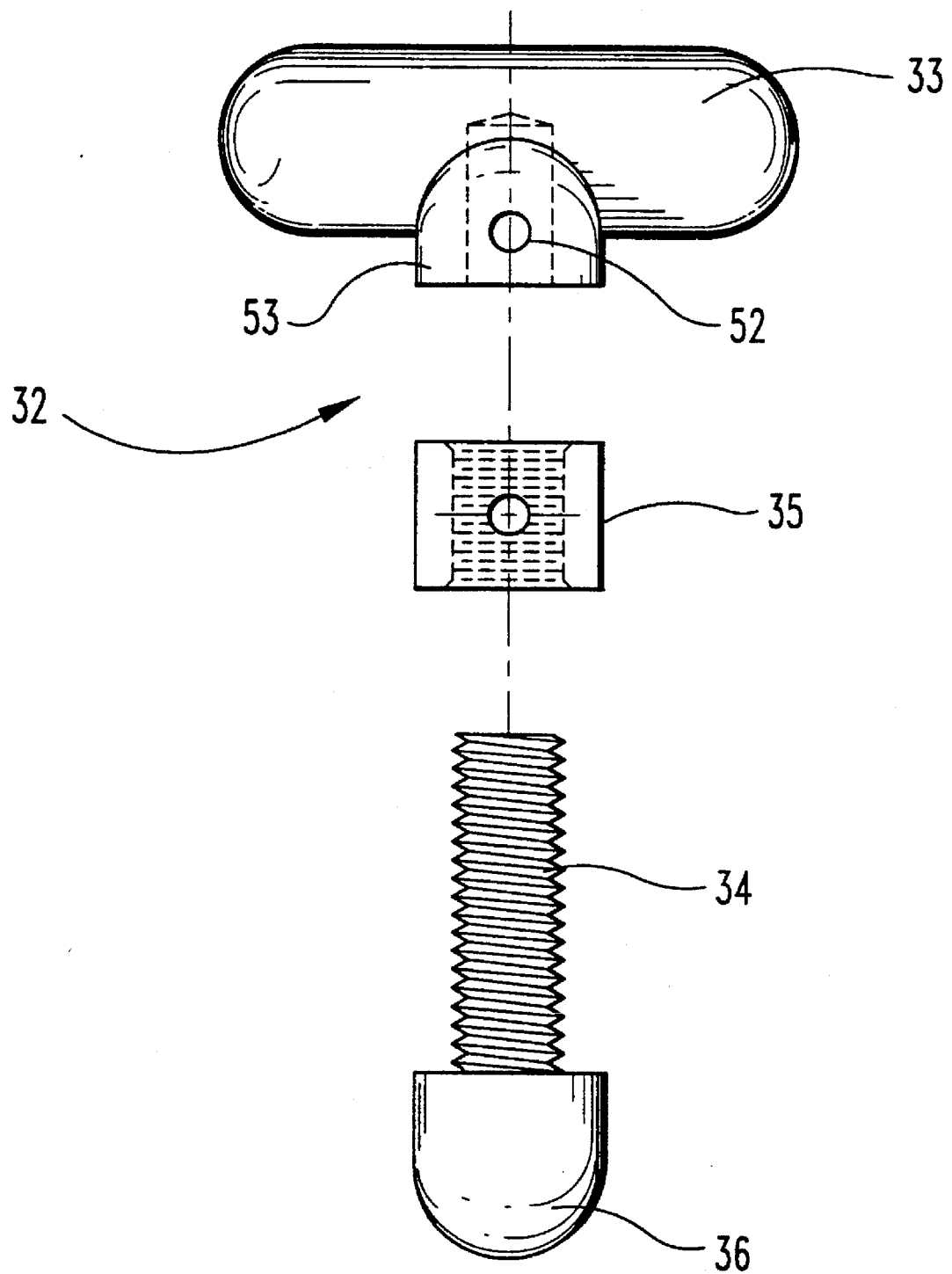
FIG. 4 is a exploded view of the retractable locking means illustrated in FIG. 2 showing a threaded pin.

Considering one aspect of the present apparatus as shown in FIGS. 2, 3 and 4, the retractable locking means 32 is composed of a handle 33, a bearing collar 35, and a pin 34 having a shaped connection end 36. The handle 33 is attached to the pin 34 by attachment means 37, which may be a machine pin, a spring pin, or a screw. The handle 33 is preferably cylindrical so it can be easily grasped by a person to rotate or pull the locking means 32. The bearing collar 35 is internally threaded and is designed to hold the retractable locking means 32 at a stable, horizontal position relative to the inner column 14.

In the preferred embodiment, the pin 34 is threaded so that when it rotates through the bearing collar 35 the shaped connection end 36 will be firmly and securely seated within the vertical multiple-step groove 15. However, it is contemplated that a smooth bore bearing collar and smooth pin could be used, provided some fixation of the pin 34 to the collar can be achieved in another manner.

The shaped connection end 36 is bullet-shaped and corresponds to bullet-shaped detents 16A and 16B. The shaped connection end 36 of pin 34, which passes through opening 21, is designed to be removably received within the detents 16A and 16B and to maintain a tight fit therewith, thereby holding the tabletop 11 securely at the desired height. It is contemplated that the shaped connection end 36 may be of other shapes, including cone- or hook- shapes, which would correspond to similarly shaped detents.

Turning to more fully consider FIG. 2, which shows the preferred embodiment of the invention as possessing a housing 30 secured to the outer column 13 through which the retractable locking means 32 passes. The interior diameter of the housing 30 should be slightly larger than the exterior diameter of the shaped connection end 36 and the bearing collar 35. The larger interior diameter of the housing 30 allows the connection end 36 and bearing collar 35 to be inserted and removed through the housing 30. The bearing collar 35 holds the retractable locking means 32 stable, relative to the outer column 13, by means of bearing collar bores 38 and 41 drilled through the bearing collar 35. The bearing collar bores 38 and 41 correspond with housing bores 39 and 42 formed through the housing 30. When the retractable locking means 32 is inserted into the housing 30, the bearing collar bores 38 and 41 align with the housing bores 39 and 42, which allows stabilizing means 31 and 40 to be inserted through the bores 39, 38, and 42, 41 respectively. As with the attachment means 37, the stabilizing means 31 and 40 may be any rod-shaped fastener such as a screw, a spring pin, or a machine pin.

FIG. 3 is an enlarged view of the vertical multiple-step groove 15 shown in FIG. 2, showing the retractable locking means 32 fully engaged in the first detent 16A with the stabilizing means 31 and 40 holding the bearing collar 35 with the housing 30.

FIG. 4 is an exploded top plan view of the retractable locking means 32. This view more clearly displays the positions of the attachment bore 52 formed through the handle 33. FIG. 4 also illustrates that in the preferred embodiment, the pin 34 is fully threaded from the end which inserts into the handle 33 up to the point at which the shaped connection end 36 begins. The threads must run tight against the shoulder of the shaped connection end 36 so that the bearing collar 35 may be mounted flush against the shoulder of the shaped connection end 36.

Figure 5:
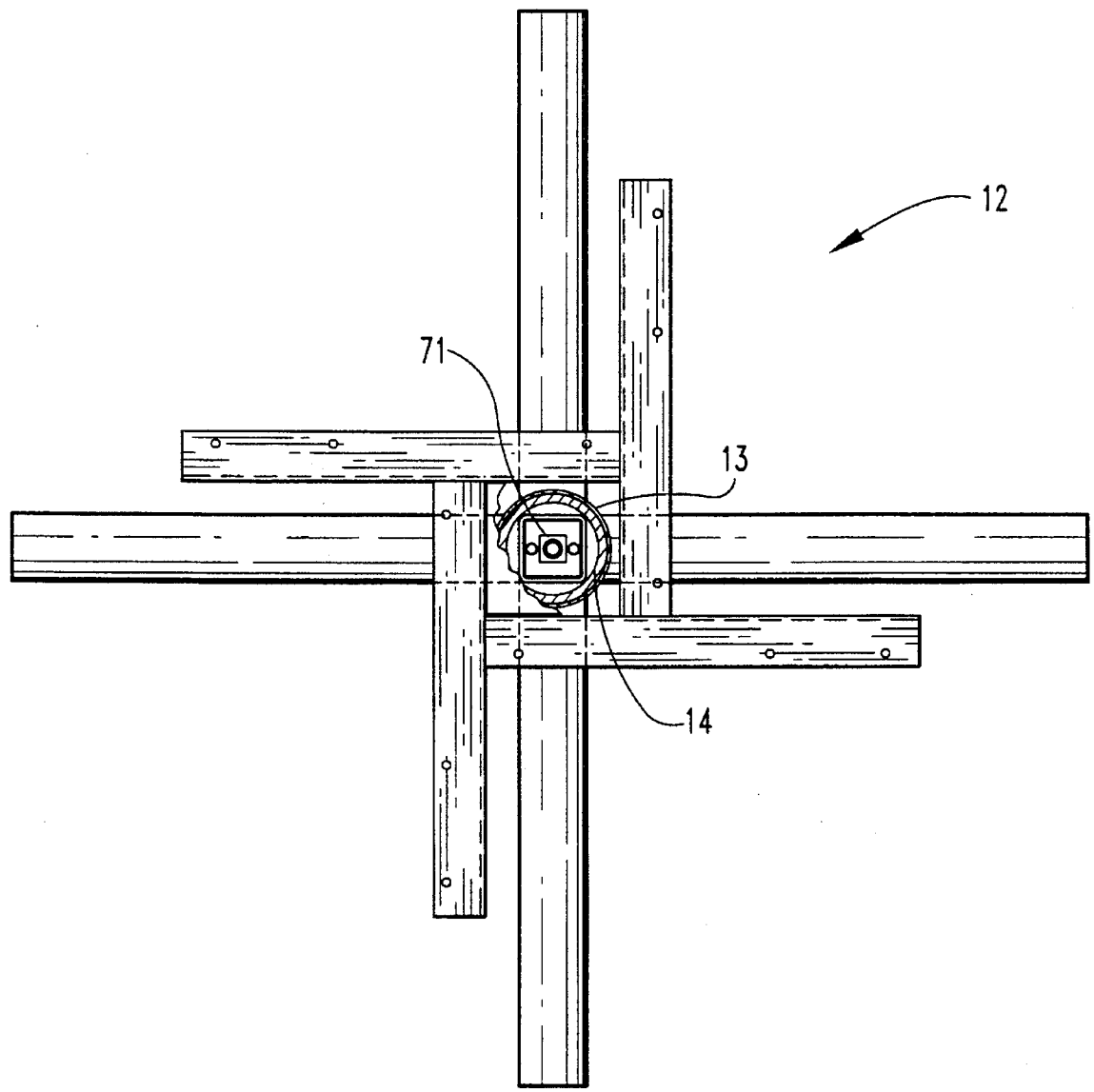
FIG. 5 is a top plan view of the base structure shown in FIG. 1.

One possible configuration for the base structure 12 is shown in FIG. 5. This top plan view of the base structure 12 illustrates the preferred placement of the inner column 14 relative to the outer column 13 upon the base structure 12. Also shown is the pneumatic means 71, according to another preferred embodiment.

Figure 6:
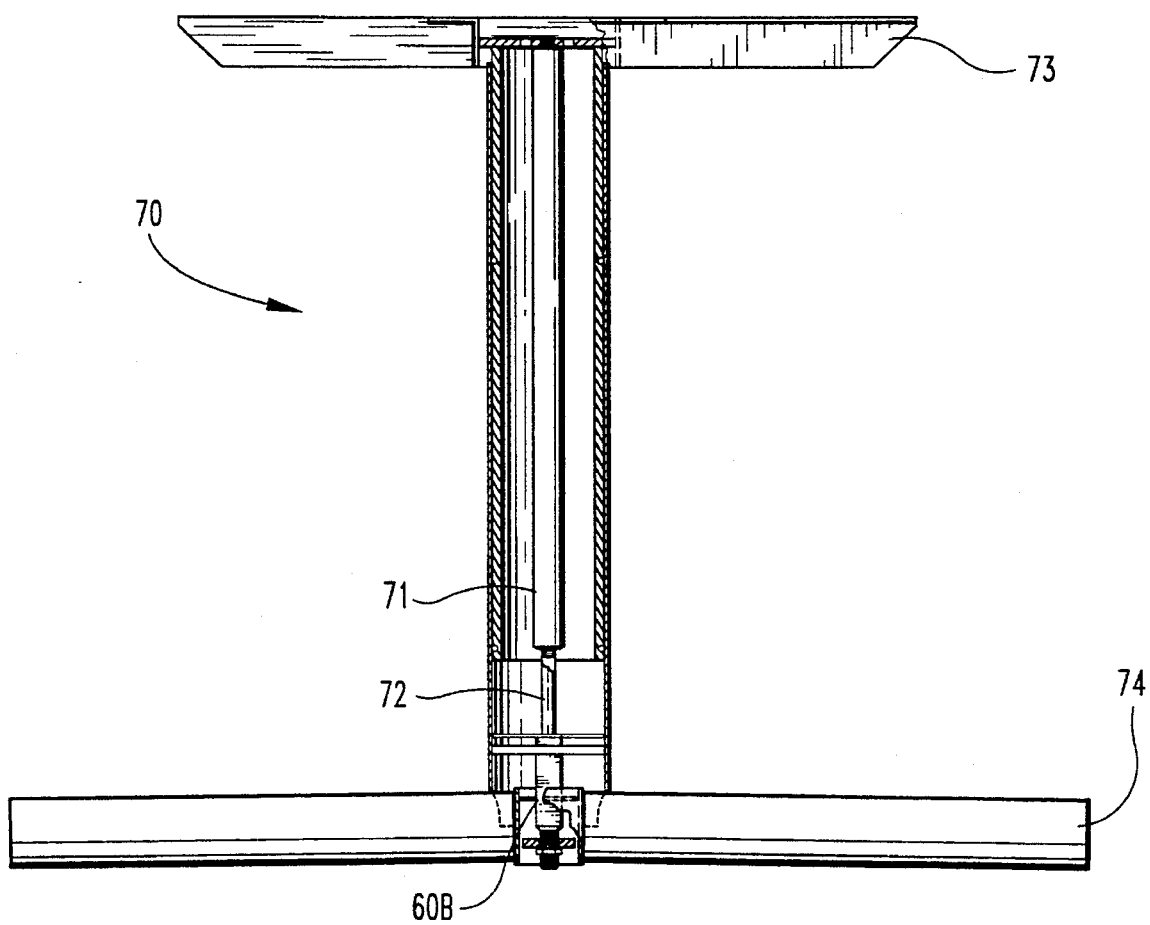
FIG. 6 is a side partial cross-sectional view of the telescopic adjustable height apparatus according to a second preferred embodiment.

In this further embodiment of the invention represented by numeral 70 in FIG. 6, a pneumatic means 71 is disposed within the inside column and is situated between the tabletop 73 and the table base 74. The pneumatic means 71 helps a user change the tabletop height position with greater ease. The pneumatic means 71 facilitates upward adjustment of the tabletop 73 by slowing the rate of ascent. This rate alteration makes the next higher detent 16 easier to locate with the shaped connection end 36. The pneumatic means 71 may similarly aid a user to lower the tabletop 73, the pressure in the pneumatic device slowing the rate of descent so that the next lower detent 16 is easier to locate with the shaped connection end 36. The controlled descent avoids the risks inherent with a rapid drop in table height.

Because the tabletop 73 may be adjusted to a range of heights, the pneumatic means 71 requires a cylinder extension 72 that can bridge the gap between the base of the inner column 14 and the connection point 60B on the base structure 74. All other features of the telescopic adjustable height mechanism 70 are identical to those of the adjustable height mechanism 10 previously described.

Several benefits and advantages of the present invention over prior adjustable table height apparatus can be discerned from the foregoing description. One advantage is that the retractable locking means 32 need not be removed from the vertical multiple-step groove 15 in order to raise or lower the tabletop 11. As well, the handle 33 portion of the retractable locking means 32 can be a typical, readily-available hand wheel which is easily threaded onto the pin 34. The retractable locking means 32 need only be loosened slightly to allow the inner column 14 to slide up or down relative to outer column 13. The retractable locking means 32 can then be quickly tightened to grip a detent 16 securely and hold the inner column 14 in position.

Another advantage of the present embodiment of the invention is that the connection end 36 cannot be fully disengaged from the inner column 14 without first removing the stabilizing means 31 and 40 (FIG. 3). This feature is accomplished by placement of the stabilizing means 31 and 40 through the depth of both the housing 30 and the bearing collar 35 by means of aligning bores 38 and 41 with bores 39 and 42 respectively (FIG. 2). If the stabilizing means 31 and 40 are not physically removed, the shaped connection end 36 cannot be fully disengaged from the vertical multiple-step groove 15. This feature adds to the safety of the apparatus. Even if pin 34, with attached connection end 36, is inadvertently loosened, the connection end 36 will remain in the multiple-step groove 15 and prevent the inner column from moving past the ends of the multiple-step groove 15.

The handle 33 in the preferred embodiment is a hand wheel having a flat head for hand tightening of the locking means 32. However, other suitable turning means could be employed, such as screws, wing nuts, internal/external threaded inserts, or thumbscrews. It is further contemplated that other types of locking means could be used, such as pins, hooks or even a rack and pinion arrangement. It is preferable, however, that the locking means be of a type that can be loosened and tightened easily by hand, without the need for tools.

In the preferred embodiment, the vertical multiple-step groove 15 and the detents 16A,B defined within this groove are defined within the inner column 14 at such distances from each other that when the retractable locking means 32 is lockably engaged in a detent 16A,B, the tabletop may assume the following heights relative to the floor (assuming a standard 1 and ¼ inch thick top is used): (1) typing height—26 ¾ "; (2) regular table height—29"; -and (3) wheelchair accessible height—32". The table top heights described above are achieved by detents 16A,16B formed within groove 15, which has a constant diameter of 0.625 inch. The depth of groove 15 varies, the lower step 17B having a depth of 0.156 inch while the upper step 17A has a depth of 0.218 inch. The lower detent 16B has a depth of 0.187 inch and the upper detent 16A has a depth of 0.250 inch. In the preferred embodiment the deepest groove depth is in the upper step 17A, however, it is contemplated that the steps within the groove could be arranged so that the lower step is deeper than the upper step. The use of a low number of possible height adjustment points in the preferred embodiment is desirable because it allows the user to find the detents quickly and adjust the table height without having to stop to check whether the height will be suitable for the user's desired application.

When assembling the components of the retractable locking means 32, it is desirable that a distance of at least ¼" be maintained between the bearing collar 35 and the handle 33 so that the entire bearing collar 35 may be contained within the housing 30. It is also desirable that the diameter of the housing 30 match the diameter of the flange 53 on the handle 33. A match between the diameters of the housing 30 and the flange 53 minimizes the chances that fingers will be pinched or clothing caught between the handle 33 and the housing 30 when the retractable locking means 32 is tightened into the vertical multiple-step groove 15.

Figure 7:
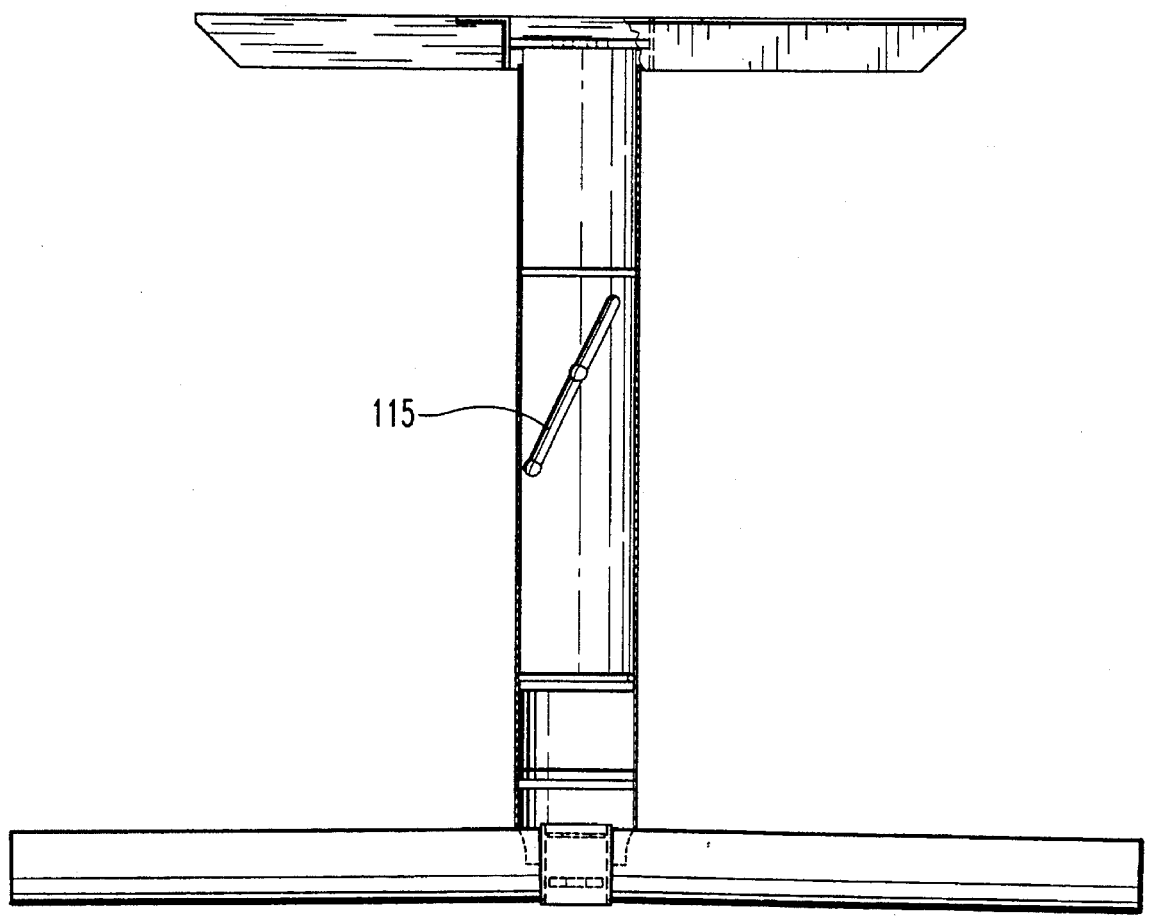
FIG. 7 is a side partial cross-sectional view of the telescopic adjustable height apparatus according to one embodiment of the invention, showing the tabletop, the base structure, the inner column, the outer column, and the multiple-step groove as milled into the inner column.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected. For example, while the groove 15 in the inner column 14 has been described as vertical, it need only be vertically oriented so that it includes a circumferential component, as shown by the groove 115 in FIG. 7. With this configuration, the tabletop cannot only be elevated but also rotated at the same time.

What is claimed is:

1. A telescopic adjustable height apparatus to adjust the height of a tabletop for a table having a tabletop, and a base structure resting upon a ground collar, said telescopic adjustable apparatus comprising:

an inner column having an exterior wall of a first diameter;

a vertically oriented groove defined within said exterior wall of said inner column, said groove divided into a plurality of steps, each step of a different depth within said inner column;

a plurality of detents defined within said vertical groove of said inner column, each detent positioned within a different one of said plurality of steps;

an outer column having an interior wall of a second diameter, said second diameter being larger than said first diameter of the inner column, said outer column being concentrically disposed about said inner column, said outer column having an opening defined therethrough and aligned with said groove;

a retractable locking means for releasably engaging each of said plurality of detents, said retractable locking means passing through said opening of said outer column;

wherein one of said inner column and outer column is connected to the tabletop and the other of said inner column and outer column is connected to said base structure.

2. The telescopic adjustable height apparatus of claim 1 wherein said retractable locking means includes a pin and a bearing collar, said bearing collar being attachable to said outer column to support said locking means, said pin passing through said opening in said outer column and being received within each of said plurality of detents.

3. The telescopic adjustable height apparatus of claim 2 wherein said pin includes a connection end shaped to be removably received within each of said plurality of detents.

4. The telescopic adjustable height apparatus of claim 3 wherein the shape of said groove matches the shape of said connection end.

5. The telescopic adjustable height apparatus of claim 2 wherein said bearing collar is internally threaded and said pin is corresponding threaded to be received within said threaded bearing collar, said threaded pin bearing against the threaded bearing collar to advance said connection end into and retract said connection end from within each of said plurality of detents.

6. The telescopic adjustable height apparatus of claim 5 wherein said pin includes a hand operated turning handle attached thereto for hand tightening and loosening of the pin.

7. The telescopic adjustable height apparatus of claim 3 wherein said connection end is bullet-shaped.

8. The telescopic adjustable height apparatus of claim 1, further comprising: spacing means disposed between said inner column and said outer column for reducing friction therebetween when said columns are moved relative to each other.

9. The telescopic adjustable height apparatus of claim 8 wherein said spacing means includes a first spacer located on the exterior of said inner column below said groove and a second spacer located located on the exterior of the inner column above said groove.

10. The telescopic adjustable height apparatus of claim 9 wherein said first spacer and said second spacer are O-rings.

11. The telescopic adjustable height apparatus of claim 2 further comprising:

a housing connected to said outer column and aligned with said opening in said outer column;

a removable fastener;

said bearing collar attached to said housing by said removable fastener;

wherein said removable fastener may be removed allowing disassembly of said bearing collar and said housing.

12. The telescopic adjustable height apparatus of claim 1 further comprising:

a pneumatic means disposed between the tabletop and the base structure, said pneumatic means facilitating easy raising of the tabletop and controlling the speed of the drop when the tabletop is lowered.

13. A telescopic adjustable height apparatus to adjust the height of a tabletop for a table having a tabletop, and a base structure resting upon a ground collar, said telescopic adjustable apparatus comprising:

an inner column having an exterior wall of a first diameter;

a plurality of detents defined within said exterior wall of said inner column, each detent vertically oriented with the detent above;

an outer column having an interior wall of a second diameter, said second diameter being larger than said first diameter of the inner column, said outer column being concentrically disposed about said inner column, said outer column having an opening defined therethrough and aligned with said detents;

a housing attached to said outer column and aligned with said opening in said outer column;

a number of removable fasteners capable of attachment to said housing;

a retractable locking means attached to said housing by said number of removable fasteners, said retractable locking means passing through said opening in said outer column and releasably engaging each of said plurality of detents;

wherein one of said inner column and outer column is connected to the tabletop and the other of said inner column and outer column is connected to said base structure.

14. The telescopic adjustable height apparatus of claim 13 wherein said retractable locking means includes a pin and a bearing collar, said bearing collar being attachable to said housing by said removable fasteners and maintaining the position of said pin, said pin passing through said opening in said outer column and being received within each of said plurality of detents.

15. The telescopic adjustable height apparatus of claim 14 wherein said pin includes a connection end shaped to be removably received within each of said plurality of detents.

16. The telescopic adjustable height apparatus of claim 15 wherein the shape of said connection end matches the shape of said plurality of detents.

17. The telescopic adjustable height apparatus of claim 14 wherein said bearing collar is internally threaded and said pin is corresponding threaded to be received within said threaded bearing collar, said threaded pin bearing against the threaded bearing collar to advance said connection end into and retract said connection end from within each of said plurality of detents.

18. The telescopic adjustable height apparatus of claim 17 wherein said pin includes a hand operated turning handle attached thereto for hand tightening and loosening of said pin.

19. The telescopic adjustable height apparatus of claim 15 wherein said connection end is bullet-shaped.

20. The telescopic adjustable height apparatus of claim 13, further comprising:

spacing means disposed between said inner column and said outer column for reducing friction therebetween when said columns are moved relative to each other.

21. The telescopic adjustable height apparatus of claim 20 wherein said spacing means includes a first spacer located on the exterior of said inner column below said groove and a second spacer located located on the exterior of the inner column above the detents.

22. The telescopic adjustable height apparatus of claim 21 wherein said first spacer and said second spacer are O-rings.

23. The telescopic adjustable height apparatus of claim 13 further comprising:

a pneumatic means disposed between the tabletop and the base structure, said pneumatic means facilitating easy raising of the tabletop and controlling the speed of the drop when the tabletop is lowered.

* * * * *

UNITED STATES PATENT AND TRADEMARK OFFICE
CERTIFICATE OF CORRECTION

PATENT NO. : 5,513,825

DATED : May 7, 1996

INVENTOR(S) : David R. Gutgsell

It is certified that error appears in the above-identified patent and that said Letters Patent is hereby corrected as shown below:

Column 2, line 1, change "When" to --The--.
Column 2, line 47, after "dental release.", return and indent to begin a new paragraph with "Still another...".
Column 3, line 37, change "Once" to --One--.

Column 8, line 26, after the words "by said", insert --number of--.

Signed and Sealed this

Seventeenth Day of September, 1996

Attest:

BRUCE LEHMAN

*Attesting Officer*   Commissioner of Patents and Trademarks